United States Patent
Merz et al.

(10) Patent No.: US 9,284,149 B2
(45) Date of Patent: *Mar. 15, 2016

(54) WINDING GLASS RIBBON BY TENSIONING INTERLEAVING MATERIAL

(75) Inventors: Gary Edward Merz, Rochester, NY (US); John Earl Tosch, Wellsburg, NY (US); Thaddeus Francis Trzeciak, Naples, NY (US)

(73) Assignee: Corning Incorporated, Corning, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/989,309

(22) PCT Filed: Nov. 29, 2011

(86) PCT No.: PCT/US2011/062349
§ 371 (c)(1),
(2), (4) Date: May 23, 2013

(87) PCT Pub. No.: WO2012/074979
PCT Pub. Date: Jun. 7, 2012

(65) Prior Publication Data
US 2013/0240656 A1    Sep. 19, 2013

Related U.S. Application Data

(60) Provisional application No. 61/417,908, filed on Nov. 30, 2010.

(51) Int. Cl.
| | | |
|---|---|---|
| *B65H 23/00* | (2006.01) | |
| *B32B 17/06* | (2006.01) | |
| *B32B 17/10* | (2006.01) | |
| *B65H 18/08* | (2006.01) | |

(52) U.S. Cl.
CPC .............. *B65H 23/00* (2013.01); *B32B 17/064* (2013.01); *B32B 17/10* (2013.01); *B65H 18/08* (2013.01); *B65H 2301/414324* (2013.01); *B65H 2511/142* (2013.01); *B65H 2515/34* (2013.01); *B65H 2801/61* (2013.01)

(58) Field of Classification Search
USPC .............. 65/253; 242/410, 530; 428/157, 189
See application file for complete search history.

(56) References Cited

U.S. PATENT DOCUMENTS

| | | | |
|---|---|---|---|
| 3,767,500 A | 10/1973 | Tally et al. ..................... 156/184 |
| 5,845,868 A | 12/1998 | Klerelid et al. ................ 242/541 |
| 5,944,273 A | 8/1999 | Lin et al. ..................... 242/160.4 |
| 6,815,070 B1 | 11/2004 | Bürkle et al. ............... 428/425.6 |
| 7,163,173 B2 | 1/2007 | Nakata et al. ................. 242/412 |
| 8,241,751 B2 | 8/2012 | Tomamoto et al. ........... 428/426 |
| 2004/0234735 A1 | 11/2004 | Reynolds et al. ............. 428/204 |
| 2007/0084959 A1 | 4/2007 | Nakata et al. ................. 242/531 |
| 2010/0026964 A1 | 2/2010 | Egawa ............................. 353/57 |
| 2010/0112301 A1 | 5/2010 | Powers .......................... 428/174 |
| 2010/0192634 A1 | 8/2010 | Higuchi et al. ................ 65/60.1 |
| 2010/0260964 A1 | 10/2010 | Nakamura et al. ............. 428/76 |
| 2011/0217521 A1 | 9/2011 | Teranishi et al. ............. 428/189 |
| 2011/0223386 A1 | 9/2011 | Tomamoto et al. ........... 428/156 |
| 2012/0156439 A1 | 6/2012 | Mori et al. .................... 428/189 |
| 2013/0045366 A1* | 2/2013 | Merz et al. .................... 428/157 |
| 2013/0133809 A1 | 5/2013 | Kondo .......................... 156/101 |
| 2014/0284412 A1* | 9/2014 | Merz et al. ................. 242/160.4 |

FOREIGN PATENT DOCUMENTS

| | | |
|---|---|---|
| EP | 2236281 | 1/2009 |
| JP | 6-304652 | 11/1994 |
| JP | 10-72163 | 3/1998 |
| JP | 2001-97733 | 4/2001 |
| JP | 2004-199643 | 7/2004 |
| JP | 2007-091413 A | 4/2007 |
| WO | 87/06626 | 11/1987 |
| WO | 99/32284 | 7/1999 |
| WO | 2010/038757 | 4/2010 |
| WO | 2010/038760 | 4/2010 |
| WO | 2010/038761 | 4/2010 |
| WO | 2011/150149 | 12/2011 |

OTHER PUBLICATIONS

International Searching Authority; International Search Report; Mailing Date: Feb. 22, 2012; pp. 1-4.
Shanghai Patent & Trademark Law Office—Office Action search report dated: (Sep. 24, 2014—wrong date, should be Aug. 13, 2014).
www.Sensorprod.com, Fujifilm, Pressure Measurement Film Prescale, Application Examples, No. 9, Measurement of roll product winding pressure distribution.
www.Sensorprod.com, Fujifilm, Prescale, Tactile Pressure Indicating Sensor Film, Heat sealing, Gasketed interface.

* cited by examiner

*Primary Examiner* — Mark Halpern
(74) *Attorney, Agent, or Firm* — Jeffrey A. Schmidt

(57) ABSTRACT

A method of winding a glass ribbon (10), including: winding an interleaving material (20) and the glass ribbon together to produce a roll (40); and tensioning the interleaving material so as to control a roll inter-layer pressure. By controlling the roll inter-layer pressure, the roll can be formed with straight side walls. The tension in the interleaving material can be controlled so as to be greater than 0 and ≤0.25 pounds per linear inch of width of interleaving material. Also, there is provided an apparatus for winding glass ribbon together with interleaving material into a roll. The apparatus includes: an interleaving material supply path; a glass ribbon supply path; a roll winding mechanism (46); and a means (26) for applying tension to interleaving material traveling along the interleaving material supply path, as the interleaving material is wound into roll (40), so as to produce a pressure between the layers of the roll.

11 Claims, 3 Drawing Sheets

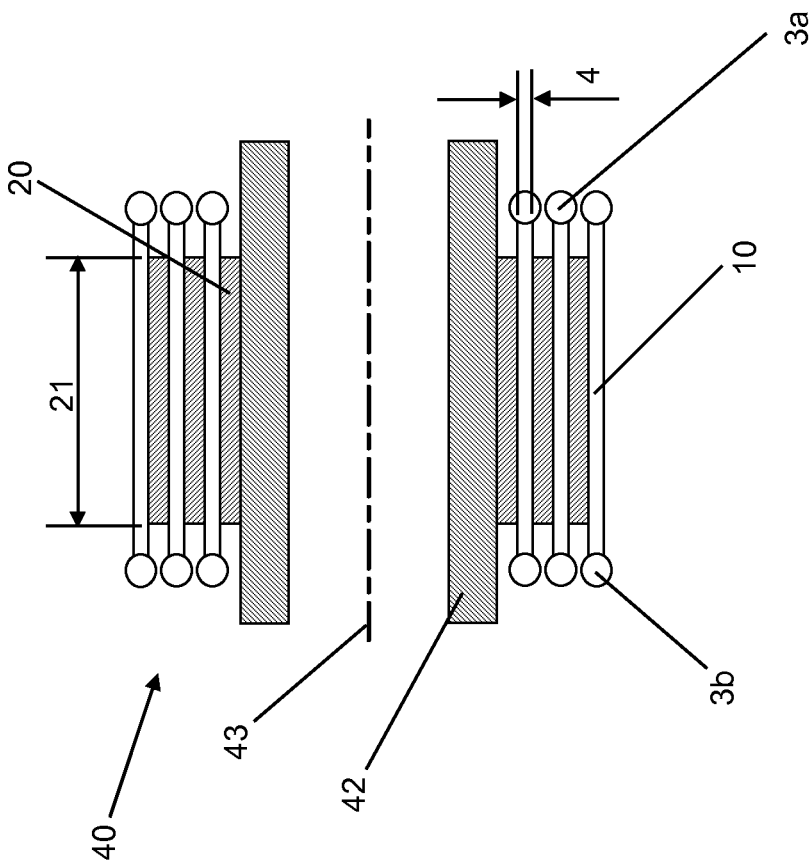
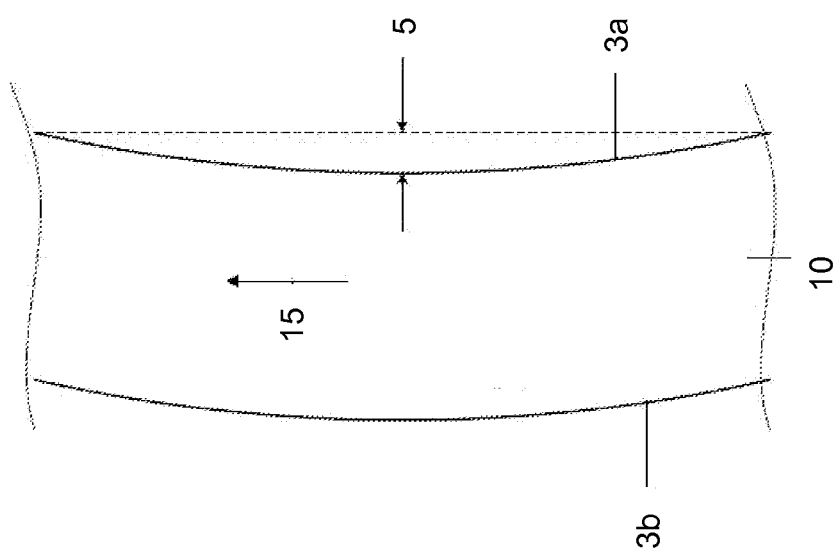

WINDING GLASS RIBBON BY TENSIONING INTERLEAVING MATERIAL

This application claims the benefit of priority of U.S. Provisional Application Ser. No. 61/417,908 filed on Nov. 30, 2010 the content of which is relied upon and incorporated herein by reference in its entirety.

This application is a 371 of PCT/US2011/062349 filed 29 Nov. 2011

BACKGROUND

1. Field

The invention is directed to methods and apparatuses for winding glass ribbon. More particularly, the invention is directed to methods and apparatuses for winding glass ribbon together with an interleaving material to form a roll.

2. Technical Background

Although formed as a continuous ribbon, glass is typically segmented into sheets as soon as it has cooled and solidified. Recent product trends—in ePaper front plane substrates, protective cover sheets in photovoltaic modules, touch sensors, solid state lighting, and electronics, for example—have resulted in requirements for thinner and thinner glass. As glass thicknesses continue to decrease, however, these sheets become more flexible. This creates a challenge from a handling perspective, particularly for glass of 0.3 mm or thinner. Accordingly, there have been attempts to wind thin glass into a roll as a manner of facilitating handling. However, there are several unique features of glass that create challenges for successfully implementing a winding process.

First the edge "beads" of the glass, as formed, are substantially thicker than the constant thickness area in between. Second, glass is extremely sensitive to surface defects. These defects create stress points that generate cracks and lead to breakage. Thus it is not advisable to have direct surface to surface contact of glass to itself, as is typical in a spooled roll of material. The challenges from these first two characteristics have been addressed by using various interleaf materials between layers of the glass ribbon when winding.

Third, as noticed by the inventors of the subject matter in the present disclosure, and which has gone unaddressed—in terms of effect on winding thin glass ribbon, i.e. 0.3 mm or thinner—is that the forming process can introduce differential thickness across the width of the glass ribbon and/or camber (continuous curvature in one direction caused by differential cooling between the two edge beads). When winding a glass ribbon with differential cross-ribbon thickness and/or camber, lateral forces are generated in the wound roll that result in angled, rather than straight, side walls on the wound roll. In some cases, the angle of the side wall may lead to the glass ribbon contacting a flange of a spool onto which the glass ribbon is being wound, thereby risking damage to the glass ribbon. Additionally, the angled side wall of the roll leads to difficulties in processing, when unwinding the roll to use the glass ribbon in a continuous manufacturing process. Accordingly, there is a need for methods of, and apparatuses for, winding glass ribbon together with interleaving material so that the roll has straighter side walls.

SUMMARY

In order to form a roll of wound glass ribbon having straight side walls, the inventors have found that the effects of the differential cross-ribbon thickness and/or camber, among other things, can be counteracted by appropriately choosing winding conditions. Some pertinent winding conditions are web tension as the roll is formed, and pressure between the layers in the roll, as well as how the tension is applied during winding of interleaving material and glass ribbon to form the roll.

More specifically, the inventors found that typical web winding process parameters of 1-2 pounds per linear inch of web tension, and 15-50 pounds per square inch of pressure between the layers, when used with a thin glass ribbon and interleaving material produced angled side walls in the roll. Further, contrary to conventional wisdom (which dictates using high tensions and inter-layer pressures to achieve better handling, better storage, and better density of rolled product), the inventors found that increasing the web tension and pressure between the layers of glass ribbon and interleaving material actually made the side wall characteristics worse. Surprisingly, the inventors found that using lower web tension and lower pressure between the layers produced straighter side walls in the roll. More particularly, a web tension of greater than 0 pounds per linear inch, but 0.25 pounds per linear inch or less (0.3 kg/cm or less), and a pressure between the layers in the roll of 10 pounds per square inch or less (0.07 MPa or less), but greater than 0 pounds per square inch, produced straight side walls on the rolled thin glass. In another embodiment, pressure between the layers in the roll of 7 pounds per square inch or less (0.05 MPa or less), but greater than 0 pounds per square inch, also produced straight side walls on the roll. Furthermore, it is desirable for the pressure between the layers in the roll to remain substantially uniform through the roll.

Additionally, the inventors found that how the tension is applied during winding of interleaving material and glass ribbon has an effect on the straightness of the sidewalls in the resulting roll. More specifically, tension should be applied to the interleaving material and not to the glass ribbon. That is, little if any tension should be applied to the glass ribbon. More specifically, the only tension applied to the glass ribbon should be that from the weight of the ribbon itself in a free-loop used to separate the upstream and rolling processes. If any significant tension (i.e., other than from frictional drag within the rollers forming the free loop, and other than the weight of the ribbon itself in the free loop) is applied to the glass ribbon itself, the effects of camber and/or thickness variation are magnified leading to undesirably angled, dished, and/or telescoped, sidewalls in the resulting roll. The tension applied to the interleaving material, as noted above, should be ≤0.25 pounds per linear inch (of width) (≤0.3 kg/cm). Further, the tension should be decreased as a function of increasing roll diameter (i.e., the roll including glass ribbon and interleaving material) and/or of decreasing diameter of the interleaving-material-supply roll. If the tension is not decreased as a function of roll diameter, the pressure between the layers in the roll will increase, gradually applying more and more pressure. If too much pressure is developed, the roll side-wall characteristics deteriorate.

Also, the type of interleaving material itself may advantageously be chosen to reduce the effects of thickness variation in the glass ribbon. More specifically, if the interleaving material is thickness compliant, or has some give to it when compressed, it can absorb thickness differences that may be present in the glass ribbon. A suitable stiffness for the interleaving material was found to be less than or equal to about 28.14 N/mm, or less than or equal to about 27.12 N/mm, or less than or equal to about 26.1 N/mm, wherein the lower bound for all ranges was greater than zero. In order to achieve the above-noted stiffness, the interleaving material may be formed from, for example, a polyethylene foam (either open or closed cell), a corrugated paper material, or a sheet of soft polyvinyl material having an embossed or textured surface.

Also, there is disclosed an apparatus for winding glass ribbon together with interleaving material into a roll. The apparatus includes an interleaving material supply path, a glass ribbon supply path, a roll winding mechanism, and a means for applying tension to interleaving material traveling along the interleaving material supply path, as the interleaving material is wound into the roll, so as to produce pressure between the layers of the roll. By applying a suitable tension to the interleaving material, there is developed a suitable pressure between the layers of glass ribbon and interleaving material in the roll whereby a roll with straight sidewalls can be produced. The means for applying tension may be a pneumatic brake, a mechanical friction brake, a magnetic particle brake, an electric brake, or a servo motor, for example. Additionally, the means for applying tension may be coupled to a roll that supplies the interleaving material, or to the interleaving material as it travels along its supply path, either directly or through a roller or roller system. A suitable controller may be coupled to the means for applying tension so as to control the means for applying tension in accordance with input received from sensors measuring either one or both of the amount of interleaving material on the interleaving-material-supply roll or the amount of material wound into the roll of glass ribbon and interleaving material.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example the various features of the invention may be combined with one another as the following aspects:

According to a first aspect, there is provided a method of winding a glass ribbon, comprising:

winding an interleaving material and a glass ribbon together to produce a roll; and tensioning the interleaving material so as to control a roll inter-layer pressure as the interleaving material and ribbon are wound.

According to a second aspect, there is provided a method of winding a glass ribbon, comprising:

winding an interleaving material and a glass ribbon together to produce a roll having a substantially constant inter-layer roll pressure.

According to a third aspect, there is provided the method of aspect 2, wherein the roll inter-layer pressure is controlled by tensioning the interleaving material.

According to a fourth aspect, there is provided the method of any one of aspects 1-3, wherein the winding further comprises winding the interleaving material onto a core for at least one wrap to form a nip of interleaving material, and inserting the glass ribbon into the nip.

According to a fifth aspect, there is provided the method of aspect 1 or aspect 3, wherein the tensioning is controlled so as to decrease tension as a function of increasing roll diameter.

According to a sixth aspect, there is provided the method of aspect 1 or aspect 3, further comprising unwinding the interleaving material from an interleaving roll, and wherein the tension is controlled so as to decrease as a function of decreasing interleaving-roll diameter.

According to a seventh aspect, there is provided the method of aspect 6, further comprising measuring the diameter of the interleaving roll.

According to an eighth aspect, there is provided the method of any one of aspects 1, 5, or 6, wherein the tensioning is controlled so as to produce an approximately constant roll inter-layer pressure between the interleaving material and the glass ribbon.

According to a ninth aspect, there is provided the method of aspect 2 or aspect 8, wherein the roll inter-layer pressure is ≤10 pounds per square inch (≤0.07 MPa), and is greater than 0 pounds per square inch.

According to a tenth aspect, there is provided the method of aspect 2 or aspect 8, wherein the roll inter-layer pressure is ≤7 pounds per square inch (≤0.05 MPa), and is greater than 0 pounds per square inch.

According to an eleventh aspect, there is provided the method of any one of aspects 1-10, wherein the glass ribbon is ≤0.3 mm thick.

According to a twelfth aspect, there is provided the method of any one of aspects 1-11, wherein the interleaving material is a thickness-compliant material.

According to a thirteenth aspect, there is provided the method of aspect 12, wherein the interleaving material is a polyethylene foam sheet having a stiffness of ≤28.14 N/mm.

According to a fourteenth aspect, there is provided the method of any one of aspects 1-13, wherein the glass ribbon forms a free loop prior to being wound together with the interleaving material.

According to a fifteenth aspect, there is provided the method of aspect 14, wherein the only tension pulling against the glass ribbon as it is wound together with the interleaving material is that produced by the free loop.

According to a sixteenth aspect, there is provided the method of any one of aspects 1-15, wherein the tension is applied to the interleaving material by a pneumatic break or servo motor coupled to the interleaving material.

According to a seventeenth aspect, there is provided the method of any one of aspects 1-16, wherein the tensioning is performed so as to produce a tension of ≤0.25 pounds per linear inch (≤0.3 kg/cm) in the interleaving material as it is wound into the roll.

According to an eighteenth aspect, there is provided a method of manufacturing a glass article, comprising:

forming a glass ribbon; and winding the glass ribbon according to any one of aspects 1-17.

According to a nineteenth aspect, there is provided the method of aspect 18, wherein the glass ribbon is formed by a down-draw process.

According to a twentieth aspect, there is provided an apparatus for winding glass ribbon together with interleaving material into a roll, comprising:

an interleaving material supply path;

a glass ribbon supply path;

a roll winding mechanism; and a means for applying tension to interleaving material traveling along the interleaving material supply path, as the interleaving material is wound into the roll, so as to produce a pressure between the layers of the roll.

According to a twenty first aspect, there is provided the apparatus according to aspect 20, wherein the means for applying tension is one of a pneumatic break and a servo motor coupled to the interleaving material.

According to a twenty second aspect, there is provided the apparatus according to aspect 20 or aspect 21, further comprising a measurement device positioned to measure the diameter of the roll.

According to a twenty third aspect, there is provided the apparatus according to aspect 22, further comprising a controller coupled to the measurement device and the means for applying tension, wherein the controller controls the means for applying tension so as to decrease the tension applied to the interleaving material as a function of increasing roll diameter.

According to a twenty fourth aspect, there is provided the apparatus according to any one of aspects 20-23, further comprising a measurement device positioned to measure a diameter of a roll from which the interleaving material is supplied along the interleaving material supply path.

According to a twenty fifth aspect, there is provided the apparatus according to aspect 24, further comprising a controller coupled to the measurement device and the means for applying tension, wherein the controller controls the means for applying tension so as to decrease the tension applied to the interleaving material as a function of decreasing interleaving-roll diameter.

According to a twenty sixth aspect, there is provided the apparatus according to any one of aspects 20-25, wherein the means for applying tension applies an amount of tension of greater than zero and ≤0.25 pounds per linear inch (≤0.3 kg/cm).

BRIEF DESCRIPTION OF THE DRAWINGS

FIG. 2 is a cross section of a roll, as taken along line 2-2 of FIG. 1.

FIG. 4 is a top view of a glass ribbon.

DETAILED DESCRIPTION

Figure 1:
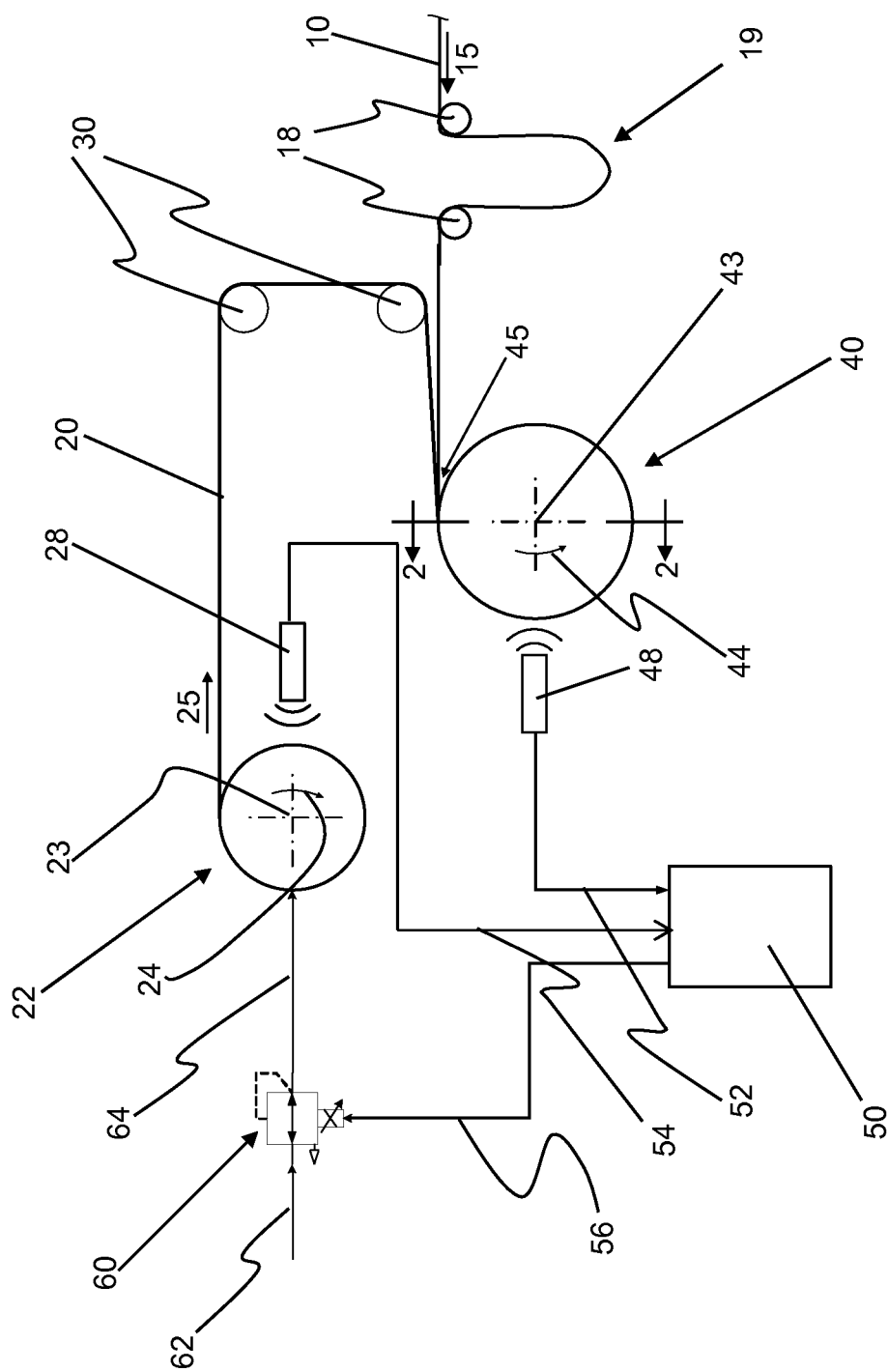
FIG. 1 is a schematic side view of an apparatus for winding a glass ribbon together with interleaving material into a roll.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

An apparatus for winding glass ribbon together with interleaving material into a roll will now be described. The apparatus includes an interleaving material supply path, a glass ribbon supply path, a roll winding mechanism, and a means for applying tension to interleaving material traveling along the interleaving material supply path, as the interleaving material is wound into the roll, so as to produce pressure between the layers of the roll. By applying a suitable tension to the interleaving material, there is developed a suitable pressure between the layers of glass ribbon and interleaving material in the roll whereby a roll with straight sidewalls can be produced. Additionally, the means for applying tension may be coupled to a roll that supplies the interleaving material, or to the interleaving material as it travels along its supply path, either directly or through a roller or roller system. A suitable controller may be coupled to the means for applying tension so as to control the means for applying tension in accordance with input received from sensors measuring either one or both of the amount of interleaving material on the interleaving-material-supply roll or the amount of material wound into the roll of glass ribbon and interleaving material.

Figure 3:
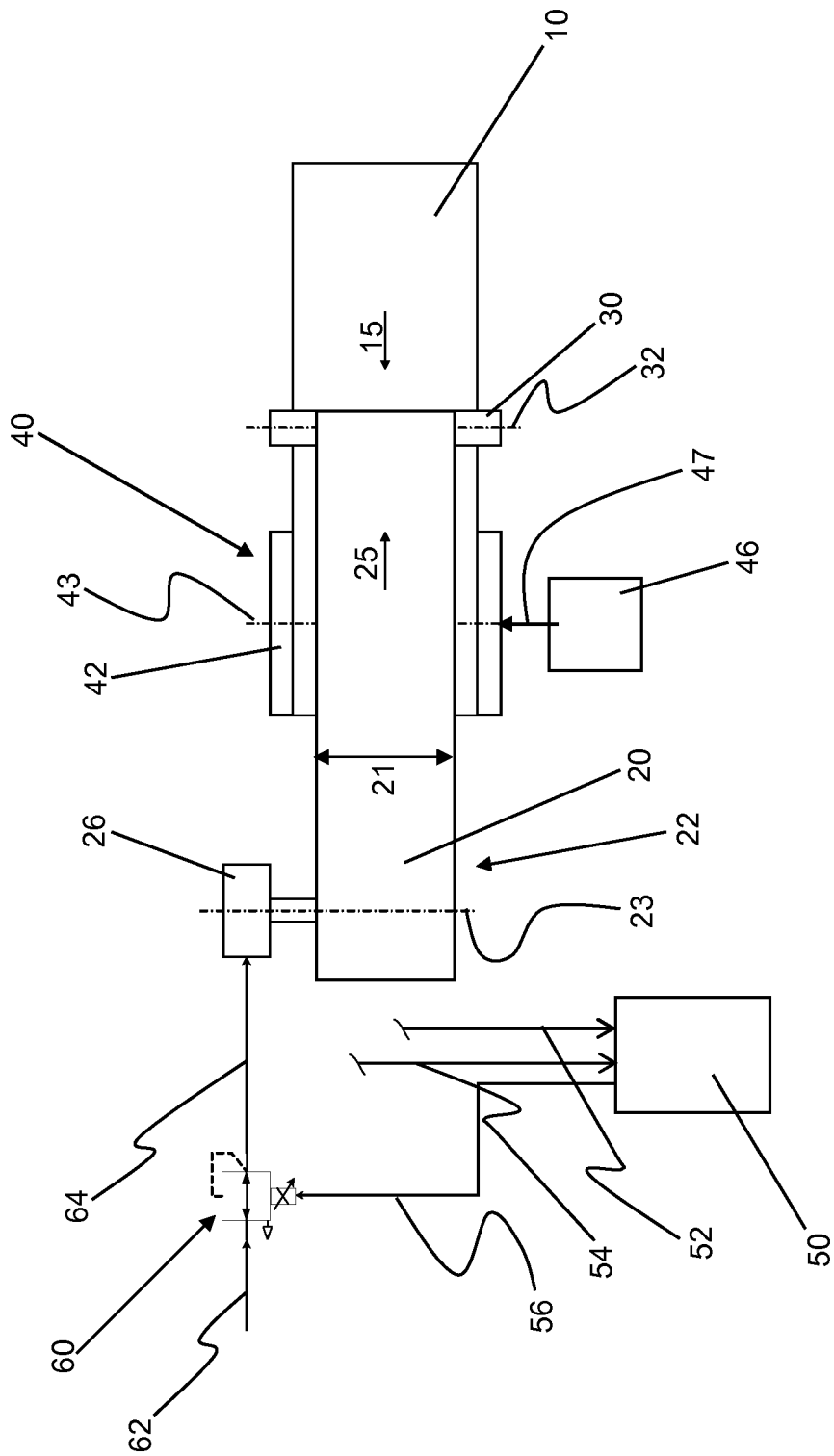
FIG. 3 is a top view of the apparatus shown in FIG. 1.

One embodiment of an apparatus for winding glass ribbon together with interleaving material into a roll will now be described in connection with FIGS. 1-3.

FIG. 1 is a schematic drawing of an apparatus for rolling a glass ribbon 10 together with interleaving material 20. The apparatus includes rollers 18 for guiding the glass ribbon 10, and rollers 30 for guiding the interleaving material 20. The rollers 18 and 30 respectively guide the glass ribbon 10 and the interleaving material 20 along respective supply paths toward a position where they may be wound together into a roll 40.

As shown in FIGS. 1-2, the roll 40 may include a core 42, having a central longitudinal axis 43 about which the core 42 rotates in the direction of arrow 44. A cross section of the roll 40 is shown in FIG. 2, which is a view taken along line 2-2 in FIG. 1, but which omits the top layer of interleaving material so as to make illustration more clear. As seen in FIG. 2, the roll 40 includes glass ribbon 10, interleaving material 20, and optionally a core 42 around which the glass ribbon 10 and interleaving material 20 are wound in alternate layers. In the roll 40, each the glass ribbon 10, and the interleaving material 20, is shown as being disposed in three layers, however, there may be any suitable number of layers of each in the roll.

Returning to FIG. 1, a sensor 48 is disposed so as to measure the amount of glass ribbon 10 and interleaving material 20 disposed on roll 40; this may be done by measuring the diameter or radius of the material on the roll 40. For example, sensor 48 may be an ultrasonic, laser, or contact, sensor. A roll winding mechanism 46 (see FIG. 3) is shown schematically as being coupled to the core 42 by arrow 47 so as to rotate the core 42 about axis 43. The winding mechanism 46 may be a motor, for example, servo motor, stepper motor, or motor driving a clutch, and may be controlled by any suitable controller as known in the industry.

The interleaving material 20 has a width 21 and is supplied in the direction of arrow 25 from an interleaving-material supply roll 22. The roll 22 has a central longitudinal axis 23, and rotates in the direction of arrow 24 as interleaving material 20 is pulled into roll 40. As shown in FIG. 3, a pneumatic brake 26 is coupled to the interleaving-material supply roll 22 so as to control the rotation thereof and, thus, apply tension to the interleaving material 20 as it is wound into roll 40. A suitable pneumatic brake is available from Nexen, headquartered in Vadnais, Minn. A sensor 28 is disposed so as to measure the amount of interleaving material 20 disposed on roll 22. Similarly to sensor 48, the sensor 28 may be an ultrasonic, laser, or contact, sensor for example, which measures the diameter or radius of material on the roll 22. As noted above, the interleaving material itself advantageously may be chosen to reduce the effects of thickness variation in the glass ribbon. More specifically, if the interleaving material 20 is thickness compliant, or has some give to it when compressed, it can absorb thickness differences that may be present in the glass ribbon 10. A suitable stiffness for the interleaving material 20 was found to be less than or equal to about 28.14 N/mm, or less than or equal to about 27.12 N/mm, or less than or equal to about 26.1 N/mm, wherein the lower bound for all ranges was greater than zero. In order to achieve the above-noted stiffness, the interleaving material 20 may be formed from, for example, a polyethylene foam (either open or closed cell), a corrugated paper material, or a sheet of soft polyvinyl material having an embossed or textured surface.

A controller 50 is coupled to sensor 48 by path 52, and to sensor 28 by path 54. Further, the controller is coupled to a control valve 60 by path 56. The controller 50 may be, for example, a programmable logic controller, or a general or special purpose computer. A suitable programmable logic controller is available from Allan Bradley, a division of Rockwell Automation headquartered in Milwaukee, Wis. If the controller 50 is a general or special purpose computer, it may also be coupled to the winding mechanism 46 to control that device. The paths 52, 54, and 56, may be wires for conducting electrical signals, or may be conduits for conducting fluids (for example, pneumatic or hydraulic). The control valve 60 may be a pneumatic or electrically controlled proportional valve, for example. A suitable control valve is available from SMC, headquartered in Noblesville, Ind.

The control valve 60 is coupled to a fluid source by path 62, and to pneumatic brake 26 by path 64. The control valve 60 receives fluid at a constant pressure along path 62, and allows fluid at a variable amount of pressure out along path 64 in response to a signal received along path 56 from the controller 50.

Methods of forming a roll of glass ribbon and interleaving material, whereby the roll has straight side walls, are also described. The methods include controlling the tension in terms both of amount, and how it is, applied to the materials being wound. More specifically, a relatively low amount of tension (greater than zero and ≤0.25 pounds per linear inch width (≤0.3 kg/cm)) is applied as the materials are being wound, and that tension is applied to the interleaving material; not to the glass ribbon. By controlling the amount and manner in which tension are applied to the materials being wound, a suitable pressure between the layers in the roll can be developed, whereby there are attained straight side walls in the roll.

One embodiment of a method for forming a roll of glass ribbon and interleaving material, wherein the roll has straight side walls, will now be described in connection with FIGS. 1-4.

The glass ribbon 10 is fed from an upstream process, for example, directly from a forming process—for example, a down draw, slot draw, fusion draw, up draw, or float, process—or from any type of conveyance process, including a process of conveying the glass ribbon during use thereof. In any case, the glass ribbon 10 is fed from the upstream process along direction 15 toward roll 40, which rotates in a direction 44. Before reaching the roll 40, the glass ribbon 10 enters a free loop 19 formed between guide rollers 18. The free loop 19 separates the upstream process from the rolling process, i.e., it compensates for differences in glass-ribbon-travel speed between the upstream and rolling processes. At about the same time that glass ribbon 10 is fed toward roll 40, an interleaving material 20 is unwound from roll 22 rotating in direction 24 and is fed along direction 25. The interleaving material 20 is positioned relative to the roll 40 by guide rollers 30. According to one aspect, the interleaving material 20 is wound around core 42 (see FIG. 2) one or more times before glass ribbon 10 is fed into a nip 45 between successive layers of interleaving material 20. According to another aspect, the glass ribbon 10 may be wound around the core 42 first and then the interleaving material 20 fed into a nip between successive layers of glass ribbon 10. In either case, the glass ribbon 10 and interleaving material 20 are wound together in alternating layers to form a roll 40 around core 42. The core 42 may remain in the roll 40 or be removed therefrom. When the core 42 is to remain in the roll 40, the inner-most layer (either interleaving material or glass ribbon) may be attached to the core 42. Keeping the core 42 in the roll 40, and attaching the interleaving material 20 to the core 42 assists in preventing the entire wound glass/interleaving material pack from side shifting during unwinding in subsequent processes steps.

FIG. 4 is a top view of a glass ribbon 10 which, as noted above, may be produced by any suitable method, for example, down-draw, fusion draw, up-draw, slot draw, or float. The glass ribbon 10 has a thickness 4 (see FIG. 2), which may be from about 50 microns to about 300 microns, and edges 3a, 3b which may be as-formed edges (including beads as shown in FIG. 2) or cut edges (not shown, but having the beads removed). The ribbon-forming process can produce variations in the thickness of the ribbon across its width, as well as "camber" in the motion of the ribbon. FIG. 4 illustrates a glass ribbon 10 which exhibits camber 5 (greatly exaggerated in this figure for purposes of illustration). As can be seen, camber 5 is a continuous curvature of the ribbon in one direction (i.e., to the left in FIG. 4). Such curvature can be caused by, for example, different rates of cooling of a ribbon's edge beads. Camber, thickness variation, and residual stresses in the glass ribbon can cause the ribbon to shift laterally, rather than conveying in a straight line. And upon attempting to wind the glass ribbon into a roll, this lateral shift causes the sides of the roll to be "dished", "telescoped", or otherwise not straight, i.e., straight side walls would generally include each of the edges 3a, 3b located substantially in one plane.

In order to overcome the effects of camber and/or thickness variation, the winding parameters for making roll 40 are chosen as set forth below. The winding parameters include how tension is applied to the materials being wound, the amount of that tension, and the resulting pressure between layers in the roll. The parameters may be useful separately from one another, or in any and all combinations, based on different circumstances.

First, tension is applied to the interleaving material 20; not to the glass ribbon 10. Because of the camber and/or thickness variation in the glass ribbon 10, the inventors have found that attempting to place any significant amount of tension on the glass ribbon 10 as it is wound causes the side walls of the roll 40 to be "dished", "telescoped", or otherwise not straight. Accordingly, the only tension applied to the glass ribbon 10 as it is being wound is that resulting from its own weight in the free loop 19. On the other hand, however, the inventors have found it desirable to apply tension to the interleaving material 20, as the interleaving material 20 is wound together with the glass ribbon 10, in order to produce a roll 40 with substantially straight side walls.

The tension applied to interleaving material 20 is established by the pneumatic brake 26 which is coupled to the roll 22 and thus provides a force resisting the pull on the interleaving material 20 by roll 40 as it winds the interleaving material 20 together with the glass ribbon 10. Accordingly, the tension can be applied to the interleaving material 20 by controlling the pneumatic brake 26. In the embodiment shown, the pneumatic brake 26 is controlled by the controller 50 via the control valve 60. For example, in a pneumatic system, the control valve 60 is a proportional control valve that is coupled to a source of air at constant pressure by path 62. The control valve 60 also receives an input signal from controller 50 via path 56. The signal from controller 50 may be based either on an input from sensor 28 or an input from sensor 48. The control valve 60 then outputs air at a decreased pressure along path 64, wherein the amount of pressure decrease is based on the signal input from controller 50. When controller 50 uses the result of a measurement from sensor 48 to produce the output signal to control valve 60, the control valve 60 decreases pressure along path 64 according to increasing roll 40 diameter. On the other hand, when controller 50 uses the result of a measurement from sensor 28 to produce the output signal to control valve 60, the control valve 60 decreases pressure along path 64 according to decreasing roll 22 diameter. In either case, the pressure along path 64 decreases. In response to the decreasing pressure on path 64, the pneumatic brake 26 applies a decreasing baking force on roll 22. Accordingly, the tension in interleaving material 20 can be decreased as a function of either increasing roll 40 diameter, or decreasing roll 22 diameter, which is beneficial for the reasons noted above, including maintaining a suitable pressure between the layers of the roll 40.

The signal from sensor 28 may also be used to adjust the amount of tension established by the pneumatic brake 64 at the start of a winding operation after a roll 22 of interleaving material 20 is firstly loaded. For example, a roll 22 may not always be full when first loaded in the winding apparatus. Accordingly, the tension established by the pneumatic brake 64 may be adjusted (by the controller 50) to a value appropriate for the size of the roll 22 by making a measurement of the size of the roll 22 with sensor 28 after the roll 22 is loaded but before a winding operation with that roll 22 starts. By knowing the size of the roll 22, an appropriate amount of breaking may be selected by the controller 50 to produce the desired amount of tension in the interleaving material 20 as it is unwound. Similarly, the signal from sensor 48 may be used to adjust the amount of tension at the start of winding a roll 40. That is, when the sensor 48 detects a roll 40 diameter indicative of a new roll 40, the controller 50 can adjust the force applied by the pneumatic brake 26 so as to develop a tension suitable for the start of the roll 40. Again, as noted above, as the material on the roll 40 then increases, a decreasing amount of tension may be applied to interleaving material 20.

Second, the amount of tension applied to the interleaving material 20 is chosen to be ≤0.25 pounds per linear inch (≤0.3 kg/cm) of width 21 of the interleaving material 20. More specifically, the inventors found that typical web winding process parameters of 1-2 pounds per linear inch of web tension (0.18 to 0.36 kg/cm), and 15-50 pounds per square inch of pressure (0.1-0.35 MPa) between the layers, when used with a thin glass ribbon 10 and interleaving material 20, produced angled side walls in the roll. Further, contrary to conventional wisdom, the inventors found that increasing the web tension and pressure between the layers actually made the side wall characteristics worse. Surprisingly, the inventors found that using lower web tension (and applying that tension to the interleaving material 20) and lower pressure between the layers (of glass ribbon 10 and interleaving material 20) produced straighter side walls in the roll 40. More particularly, a tension of greater than 0 pounds per linear inch, but 0.25 pounds per linear inch or less (0.3 kg/cm), applied to the interleaving material 20, produced straight side walls on the roll 40.

As noted above, it is advantageous to decrease the amount of tension applied to interleaving material 20 as the roll 40 increases in size, so as to—among other things—maintain a suitable pressure between the layers in the roll 40. Because the above-noted tension range is given in force per unit width, the total amount of tension is directly dependent of the width 21 of the interleaving material 20. That is, the total amount of tension simply is the tension in pounds per inch multiplied by the inches in the width 21 of the interleaving material 20. On the other hand, the tension applied to the interleaving material 20 is largely independent of the speed at which roll 40 rotates.

Third, the pressure between the layers of glass ribbon 10 and interleaving material 20 in the roll 40, as a result of the above-described winding conditions, also plays a part in producing a roll 40 with straight side walls. By controlling the above-described winding conditions, the resultant pressure between the layers in the roll 40 can be maintained greater than zero and ≤10 pounds per square inch (≤0.07 MPa). According to another aspect, the pressure between the layers in the roll 40 can be maintained greater than zero and ≤7 pounds per square inch (≤0.05 MPa). As noted above, maintaining a pressure between the layers (glass ribbon 10 and interleaving material 20) of the roll 40 within the noted ranges, advantageously a roll 40 having straight sidewalls can be produced. Further, it is desirable to maintain a substantially constant inter-layer pressure through the roll 40.

EXAMPLE-1

A glass ribbon having a thickness of 150 microns was wound into a roll together with an interleaving material of irradiated cross linked Ethylene Vinyl Acetate (EVA) copolymer foam having a thickness of 1/32 inch, a width of 11 inches (28 mm), and a density of 6 lbs. per cubic foot (0.1 grams per cubic cm) (available from FLEXcon of Spencer, Mass. as FLEXcon P.E.F. 32 white no PS). The roll was started by winding the interleaving material around a roll core (having a nominal diameter of 20 inches (508 mm), 18 inch (457 mm) minimum diameter, and 24 inch (610 mm) maximum diameter), and then feeding glass ribbon to a nip formed by the interleaving material. The parameters for winding the roll were as follows:

the roll was wound at a speed of 12.5 to 28 feet per minute the diameter of the finished roll (as measured to the outermost layer of the glass ribbon and interleaving material) was less than 29 inches the breaking torque applied to the interleaving material roll was 5 in-lbs (0.56 Nm) at the start of rolling, and was decreased to 1 in-lb (0.11 Nm) at the end of rolling.

the diameter of the interleaving roll material ranged from 22 inches (559 mm) (1050 ft. (320 m) on the roll) to 18.5 inches (470 mm) (700 ft. (213 m) on the roll)

the tension applied to the interleaving material was approximately 0.06 to 0.12 pounds per linear inch (0.011 to 0.022 kg/cm)

the resulting pressure between layers in the roll was measured to be less than 7 pounds per square inch (0.05 MPa)—the lower detection limit of the pressure indicating sensor film (by FujiFilm, Japan, distributed through Sensor Products Inc.) placed between a layer of glass ribbon and a layer of interleaving material controller 50 was Allen Bradley, model RS Logix 500, by Rockwell Automation, Milwaukee, Wis., USA pneumatic brake 22 was a Nexen model 800113 control valve 60 was an SMC electronic regulator

Using the above parameters and equipment, a roll of glass ribbon and interleaving material was wound, wherein the roll had straight sidewalls.

EXAMPLE-2

A glass ribbon and interleaving material were wound together into a roll in the same manner, and with the same equipment, as set forth in Example 1, except that the pneumatic brake was set at 5.5 in-lbs (0.62 Nm) of torque, 12 psi (0.084 MPa), for the entire rolling process, whereby it applied a tension of approximately 0.07 pounds per linear inch (0.013 kg/cm) to the interleaving at the start of rolling, which tension linearly increased to 0.5 pounds per linear inch (0.09 kg/cm) by the end of rolling. The roll of glass ribbon and interleaving material did not have straight sidewalls.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the core 42 is shown without flanges on its ends, flanges could be present. Further, the flanges could be permanently attached to the core 42, or could be removable.

Additionally, although three layers of interleaving 20 and three layers of glass ribbon 10 are shown as being wound on a roll 40, any suitable number of layers of either may be present.

Further, although a pneumatic example was given for purposes of illustration, other methods and devices can be used. For example, instead of using a pneumatic brake, a servo motor run in torque mode could be used and controlled by varying the input current. When using a servo motor, the proportional control valve would not be pneumatic, and may be omitted if suitable control can be performed by controller 50, as when controller 50 is a general or special purpose computer. Still further, the pneumatic brake could be replaced by any other suitable type of tension applying device, for example, a mechanical friction brake, a magnetic particle brake, an electric brake, or a servo motor. Any one of these devices, that applies tension to the interleaving material, traveling along the interleaving material supply path as the interleaving material is wound into the roll 40, so as to produce pressure between the layers of the roll, acts as a means for applying tension to the interleaving material.

Moreover, although the pneumatic brake is shown as being coupled to the roll of interleaving material directly, instead either the pneumatic brake, servo motor, or other tension applying device, could be coupled to the interleaving material by a separate roller or roller system. Such a roller system could be integrated with the guide rollers 30 that direct the interleaving material 20 along the supply path in the direction of arrow 25. The interleaving web could also be wrapped around a roller with load cells incorporated into the bearing mounts. These load cells could be calibrated to measure tension in the interleaving directly, and this information could then be used by the control system to maintain the appropriate tension, as described above. One consideration is that the means for applying tension apply tension to the interleaving material, as it is being wound together with the glass ribbon, so as to produce a pressure between the layers of interleaving material and glass ribbon. By maintaining a suitable inter-layer pressure in the roll, there is produced a roll having straight side walls.

We claim:

1. A method of winding a glass ribbon, comprising:
winding an interleaving material and a glass ribbon together;
controlling the interlayer pressure during winding so as to produce a roll having a substantially constant inter-layer roll pressure between the interleaving material and the glass ribbon,
wherein the roll inter-layer pressure is controlled by tensioning the interleaving material, and further wherein the tensioning is controlled so as to decrease tension as a function of increasing roll diameter.

2. The method of any one of claim 1, wherein the winding further comprises winding the interleaving material onto a core for at least one wrap to form a nip of interleaving material, and inserting the glass ribbon into the nip.

3. The method of claim 1, further comprising unwinding the interleaving material from an interleaving roll, and wherein the tension is controlled so as to decrease as a function of decreasing interleaving-roll diameter.

4. The method of claim 1, wherein the tensioning is controlled so as to produce an approximately constant roll inter-layer pressure between the interleaving material and the glass ribbon.

5. The method of claim 1, wherein the roll inter-layer pressure is ≤10 pounds per square inch, and is greater than 0 pounds per square inch.

6. The method of claim 1, wherein the glass ribbon is ≤0.3 mm thick.

7. The method of claim 1, wherein the interleaving material is a polyethylene foam sheet having a stiffness of ≤28.14 N/mm.

8. The method of claim 1, wherein the glass ribbon forms a free loop prior to being wound together with the interleaving material.

9. The method of claim 8, wherein the only tension pulling against the glass ribbon as it is wound together with the interleaving material is that produced by the free loop.

10. The method of claim 1, wherein the tension is applied to the interleaving material by a pneumatic break or servo motor coupled to the interleaving material.

11. The method of claim 1, wherein the tensioning is performed so as to produce a tension of ≤0.25 pounds per linear inch in the interleaving material as it is wound into the roll.

* * * * *